United States Patent [19]

Marcus

[11] Patent Number: 4,684,033

[45] Date of Patent: Aug. 4, 1987

[54] DEVICE FOR RETARDING OXIDATION OF PARTLY CONSUMED BOTTLE OF WINE

[76] Inventor: Edward J. Marcus, 35 E. 75th St., New York, N.Y. 10021

[21] Appl. No.: 854,601

[22] Filed: Apr. 22, 1986

[51] Int. Cl.⁴ ............................................. B65D 39/12
[52] U.S. Cl. ..................................... 215/269; 53/488; 53/489
[58] Field of Search .................. 215/269, 231; 53/485, 53/487, 488, 489

[56] References Cited

U.S. PATENT DOCUMENTS

| | | | |
|---|---|---|---|
| 713,708 | 11/1902 | Spire | 215/269 |
| 3,343,701 | 9/1967 | Mahoney | 215/269 X |
| 4,392,578 | 7/1983 | Fipp et al. | 215/269 X |
| 4,482,072 | 11/1984 | Hankins | 215/269 |

Primary Examiner—Donald F. Norton
Attorney, Agent, or Firm—Lewis H. Eslinger

[57] ABSTRACT

Apparatus for retarding oxidation of a liquid that only partly fills a container formed with an opening through which a liquid can be poured comprises a cap mountable adjacent to the opening, an inflation tube insertable through the cap, and an air bladder connected to the inflation tube and positionable within the container. A pump is connected to the inflation tube and positionable outside the container. A valve is connected to the pump and the inflation tube. An exhaust tube is insertable through the inflation tube and has an inlet portion positionable in the container and an outlet portion positionable outside the container. When the cap is mounted adjacent to the opening, the air bladder and the inlet portion of the exhaust tube are positioned within the container, the pump and the outlet portion of the exhaust tube are outside the container, and the pump is activated, the air bladder expands within the container and expels air therefrom through the exhaust tube, so that oxygen is substantially prevented from coming into contact with the liquid.

7 Claims, 6 Drawing Figures

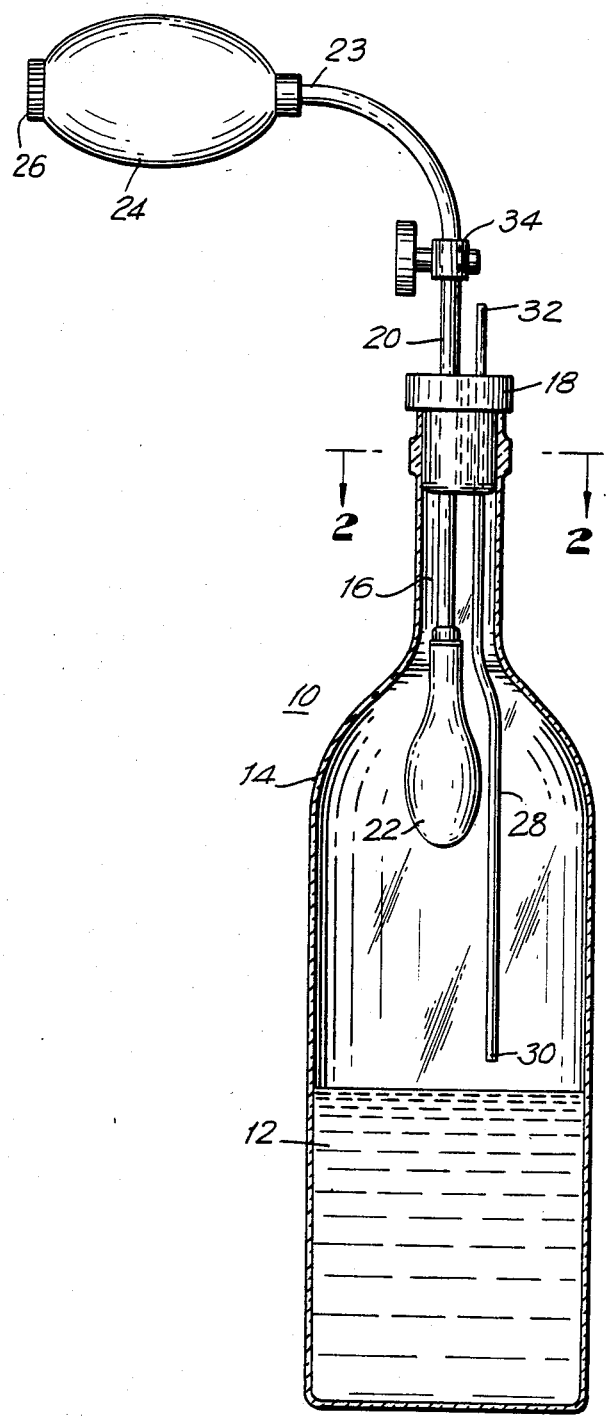
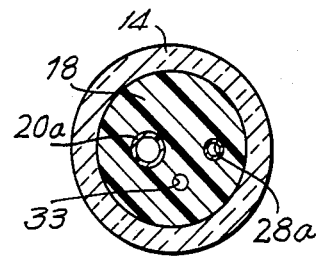
FIG. 2
FIG. 1

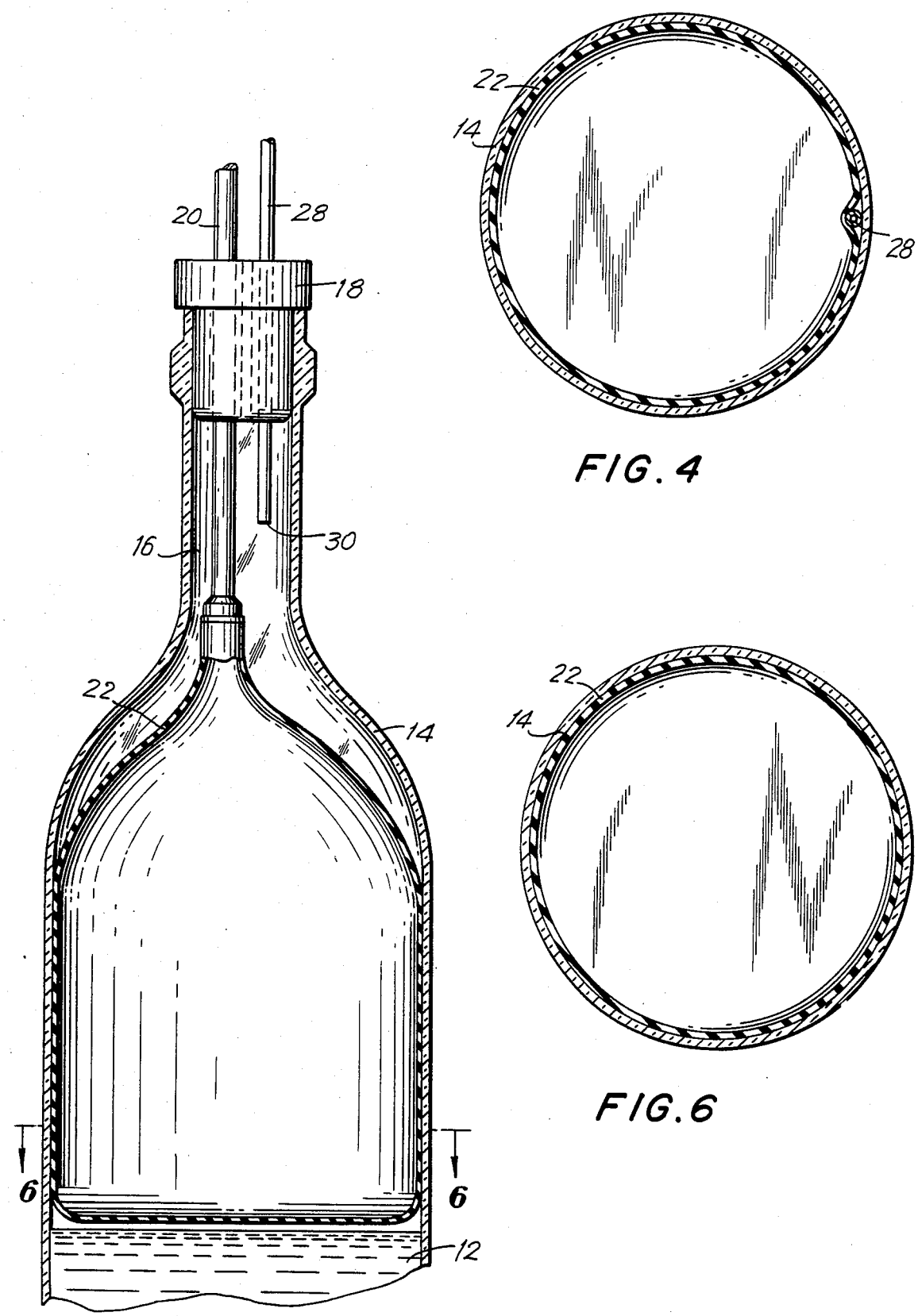

DEVICE FOR RETARDING OXIDATION OF PARTLY CONSUMED BOTTLE OF WINE

BACKGROUND OF THE INVENTION

1. Field of the Invention

This invention relates to the preservation of an oxygen sensitive liquid in a container and, more particularly, to novel and highly-effective apparatus for retarding oxidation of a liquid such as wine that only partly fills a container such as a bottle that is formed with an opening through which the liquid can be poured.

2. Description of the Prior Art

Many liquids, such as table wines, are susceptible to oxidation and must be protected against excessive oxidation. When a bottle of table wine is opened and only partly consumed, the unconsumed portion deteriorates rapidly, even if the bottle is recorked, because of oxidation by the oxygen in the air that replaces the consumed portion of the wine.

In the making of table wines, following fermentation of the grapes, a period of slow development begins which can be accomplished in a few weeks or can occupy decades, depending on the needs of the wines themselves. The action of oxygen, a twenty percent component of air, plays an indispensable role in the maturing of the wine, but exposure of the wine to oxygen must be carefully controlled.

As the newly fermented wine is transferred to casks, and later from casks to bottles, it is exposed to air, absorbing some oxygen. In cask, rather liberal access of air to the wine induces a period of rapid development. If left too long in cask, the wine quickly grows old, losing its desirable qualities even before it matures. Only slow maturing in bottles, following a short time in cask, can allow complex wine, particularly red wine, to develop the subtle qualities for which it is valued.

Until the eighteenth century, no means was known to control the maturing of wine. Wines were stored in barrels, and were consumed promptly in a race against spoilage. Only with the invention of the bottle cork and corkscrew did the art of winemaking begin to acquire refinement. The cork allowed the vintner to control for the first time the exposure of table wine to the oxygen of the air.

Even after bottling, wine continues slowly to absorb minute amounts of oxygen, which enters the bottle very gradually through the cellular structure of the cork and through the space between cork and glass. Although fatal in large doses, oxygen in controlled amounts is instrumental to the growth and maturation of wine.

Ordinarily the cork is drawn from a bottle of table wine with the intention of drinking the contents without delay—e.g., within the span of a meal. It is common knowledge that free exposure of wine to the air causes the wine to oxidize and age rapidly—within a few hours at most. The excessively oxidized wine may still be drunk, but with diminished pleasure. It will have lost its freshness and subtlety, and taken on a flat, lifeless and bitter taste.

Several conventional means are available to preserve the character of the remaining wine in a bottle that has been opened; all have serious drawbacks, especially when used in the home. One way is to drop sanitized glass marbles into the bottle until enough marbles have piled up in the bottom to displace the wine upward to the level of the bottle's neck. The cork may then be replaced, and the wine will be protected from the air.

This method has the advantage of simplicity and economy. However, it is time consuming and inconvenient. The marbles are arduous to clean and insert, and the wine in the marble-filled bottle is hard to pour. This method is worth the trouble only for a rather fine or expensive wine.

Another means, of recent invention, is a nitrogen-atmosphere device marketed under the name "Cruvinet." The device is made in various models for use in the home and in clubs, bars and restaurants. Different models can accommodate different numbers of bottles at one time. The smallest model, intended for home use, can accommodate a single bottle, while the largest device developed so far, intended for commercial use, can accommodate ninety-six bottles. The device enjoys a certain success among commercial establishments, but it has very serious drawbacks in the home.

The device replaces wine drawn from a bottle with nitrogen gas, which is inert and has no effect on the remaining wine. The nitrogen prevents oxygen from reaching the wine, thereby protecting it from rapid oxidation. The disadvantages of the device for home use lie in its size, inconvenience and cost. The smallest model, which holds one bottle, costs several hundred dollars. It takes up considerable space, in part because it must house a tank of nitrogen gas, without which it cannot function. The device therefore takes on the role of a piece of furniture, with its associated problems of decor and appropriateness. The nitrogen gas must be continually replenished, an additional expense and inconvenience. Furthermore, the tubes and fittings used to draw off the wine from the bottles must be dismantled and cleaned after each use, a cost in time and effort. The device is acceptable in commercial use; in the home its use is limited to those among the well-to-do who can accept its obtrusiveness and need for maintenance.

OBJECTS AND SUMMARY OF THE INVENTION

An object of the invention is to overcome the drawbacks of conventional devices outlined above and in particular to provide improved apparatus for retarding oxidation of a liquid that only partly fills a container formed with an opening through which the liquid can be poured.

Another object of the invention is to provide such apparatus that is inexpensive, durable, compact, simple in design, and quick and easy to use and to maintain.

The foregoing and other objects of the invention are attained by the provision of apparatus for retarding oxidation of a liquid that only partly fills a container formed with an opening through which said liquid can be poured. The apparatus comprises: cap means mountable adjacent to the opening; inflation tube means insertable through the cap means; air bladder means connected to the inflation tube means and positionable within the container; pump means connected to the cap means and positionable outside the container; valve means connected to the pump means and the inflation tube means; and exhaust tube means insertable through the cap means and having an inlet portion positionable within the container and an outlet portion positionable outside the container; whereby, when the cap means is mounted adjacent to the opening, the air bladder means and the inlet portion of the exhaust tube means are positioned within the container, the pump means and the outlet portion of the exhaust tube means are outside the container, and the pump means is activated, the air bladder means expands within the container and expels air therefrom through the exhaust tube means, so that oxygen is substantially prevented from coming into contact with the liquid.

BRIEF DESCRIPTION OF THE DRAWING

A better understanding of the objects, features and advantages of the invention may be gained from the following detailed description of the preferred embodiment thereof, in conjunction with the appended drawing, in the figures of which a given reference character always designates the same element or part and wherein:

FIG. 1 is a sectional view in elevation of apparatus constructed in accordance with the invention, the apparatus being shown in a ready condition;

FIG. 2 is a sectional view taken substantially along the line 2—2 of FIG. 1 and looking in the direction of the arrows;

FIG. 4 is a sectional view taken substantially along the line 4—4 of FIG. 3 and looking in the direction of the arrows;

FIG. 5 is a view similar to FIGS. 1 and 3 but showing the apparatus in a second phase of the actuated condition; and FIG. 6 is a sectional view taken substantially along the line 6—6 of FIG. 5 and looking in the direction of the arrows.

DESCRIPTION OF THE PREFERRED EMBODIMENT

Figure 3:
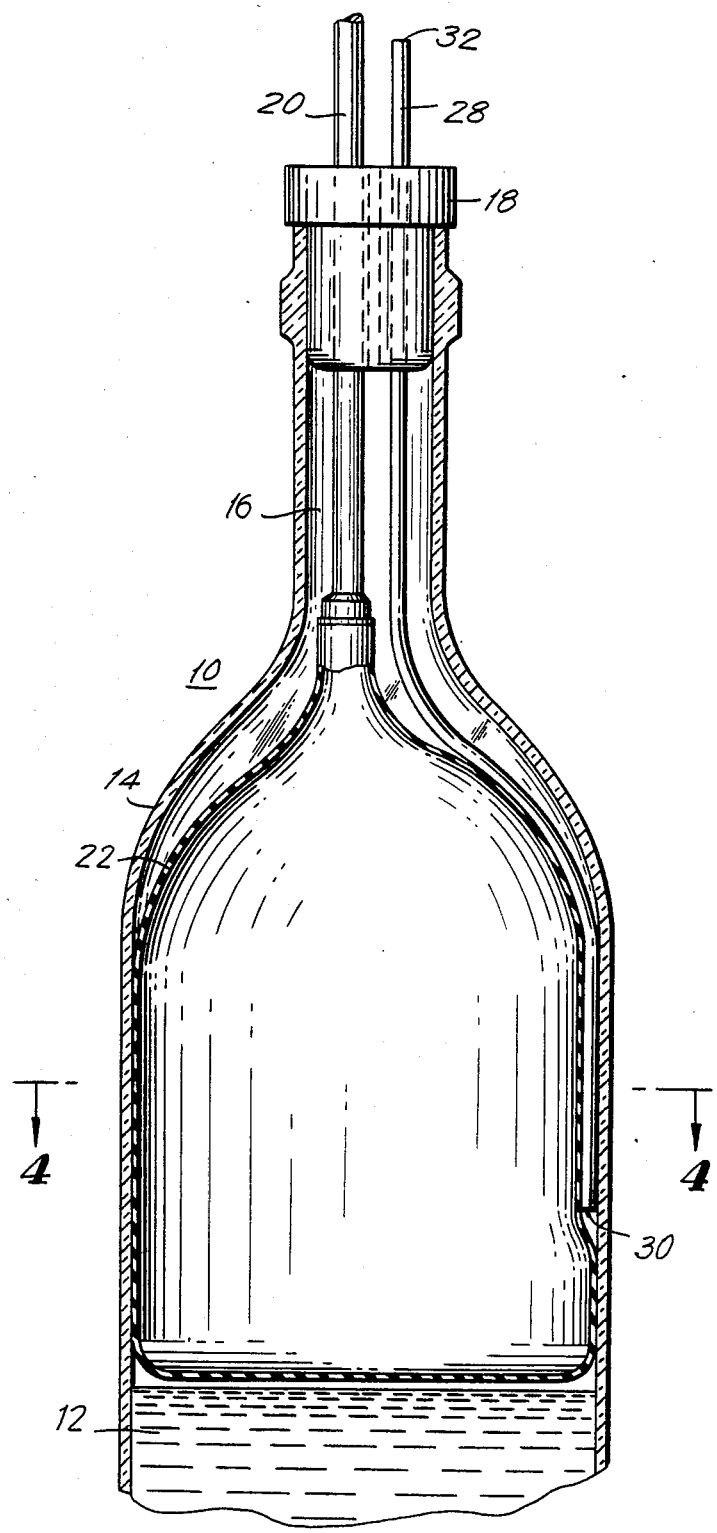
FIG. 3 is a view similar to FIG. 1 but showing the apparatus in a first phase of an actuated condition.

FIG. 1 shows apparatus 10 for retarding oxidation of a liquid such as wine 12 in a container such as a wine bottle 14 that is formed with an opening 16 such as a bottle neck through which the wine 12 can be poured. It is understood that the wine bottle 14 has previously been uncorked and a portion of its contents consumed, so that the wine 12 only partly fills the wine bottle 14. When the bottle 14 is initially corked, the wine 12 substantially fills the bottle 14, so that only a small amount of air remains in the wine bottle and consequently only a small amount of oxygen is initially available to oxidize the wine 12. In addition, oxygen can seep slowly through the interstices of the cork (not shown) and between the cork and the interior wall of the neck 16 of the bottle 14, but these combined sources of oxygen permit only a very slow oxidation of the wine. When the bottle is uncorked and a portion of the wine is consumed, air occupies the portion of the wine bottle formerly occupied by the consumed wine, and this enables a much more rapid oxidation of the remaining wine, even if the bottle is recorked. Not only is there more air and hence more oxygen in the wine bottle 14, but also the remaining quantity of wine 12 is less than in a full bottle, so that both the numerator and the denominator of the oxygen/wine ratio are changed in such a direction as to hasten the oxidation of the wine.

In accordance with the invention, a cap 18 is mountable adjacent to the neck 16 of the wine bottle 12, and an inflation tube 20 is insertable through the cap 18. An air bladder or balloon 22 is connected to the inflation tube 20 and positionable within the wine bottle 14.

A pump such as a squeeze bulb 24 is connected to the inflation tube 20 and positionable outside the wine bottle 14. A valve 26 is connected directly to the squeeze bulb 24 and indirectly to the inflation tube 20. The valve 26 may for example be a check valve physically incorporated in the squeeze bulb 24 which is connected directly to the inflation tube 20. Squeeze bulbs having check valves incorporated therein are commonly used for example in sphygmomanometers.

An exhaust tube 28 made of a material having a low coefficient of friction, such as a synthetic fluorine-containing resin sold under the trademark "Teflon", is insertable through the cap 18 and has an inlet portion 30 positionable within the bottle 14 and an outlet portion 32 positionable outside the bottle 14.

As FIG. 2 best shows, the cap 18 is formed with a hole 20a through which the inflation tube 20 passes, the hole 28a through which the exhaust tube 28 passes, and a vent hole 33. The vent hole 33, which may have a diameter on the order of 1/16 inch, extends vertically through the cap 18 at any location in which there is no interference with the inflation tube 20 and the exhaust tube 28. In fact, since the cap 18 does not form a seal, it can be essentially an open jig or frame that positions the inflation tube 20 and exhaust tube 28 and freely vents the interior of the bottle 14.

When the cap 18 is mounted adjacent to the bottle neck 16, the air bladder 22 and the inlet portion 30 of the exhaust tube 28 are positioned within the bottle 14, the pump or squeeze bulb 24 and the outlet portion 32 of the exhaust tube 28 are outside the bottle 14 and the pump or squeeze bulb 24 is activated, the air bladder 22 expands within the bottle 14 and expels air therefrom through the exhaust tube 28, so that oxygen is substantially prevented from coming into contact with the wine 12.

The air bladder 22 preferably comprises an elastomeric balloon, as shown in the figures. Alternatively, the bladder 22 may comprise a sack made of a non-stretch material which is foldable so that, in the folded state, it can be inserted into and removed from the bottle 14, and, upon activation of the pump 24, it can be expanded so that it assumes substantially the shape and size shown in FIG. 3. The air bladder 22 should be made of a material that is substantially impermeable to air and does not react with wine. An elastomeric balloon suitable for use in accordance with the present invention can be made of natural rubber coated on the inside with Butyl rubber.

At least the lower part of the exhaust tube 28 is flexible and displaced laterally by the bladder 22 as the bladder 22 expands.

The figures illustrate the pump 24 as comprising a squeeze bulb. Alternatively, it can comprise a piston-cylinder assembly or push button for generating pulses of air in the manner of a hand-operated spray gun for spraying an insecticide.

A gate valve, globe valve or stopcock 34 is connected to the inflation tube 20 for maintaining the bladder 22 in an inflated condition after the bladder 22 is inflated.

In operation, the cap 18 is inserted in the mouth 16 of the partly-consumed bottle 14 of wine 12. No tool is needed to insert or remove the cap 18. The inflation tube 20 passes through the cap 18 and extends into the bottle 14 almost to the surface of the wine 12. Before inflation (FIG. 1), the bladder or balloon 22 hangs suspended in the bottle 14 above the remaining wine 12. Also passing through the cap 18 is the flexible air exhaust tube 28, which can be adjusted so it hangs down to a point just above the level of the wine 12. The purpose of this tube 28 is to allow the air trapped in the bottle to be expelled as the bladder 22 is inflated. Above the cap 18, attached to the upper end 23 of the inflation tube 20, is the inflation bulb or pump 24 equipped with the check valve 26. The bulb or pump 24 is squeezed in the hand to inflate the bladder 22, which swells to occupy the empty space in the bottle, forming an effective seal against the incursion of air by pressing tightly against the walls of the bottle 14. As the bladder 22 fills with air, the thin air exhaust tube 28 is deflected to the side (FIG. 3), pressed by the bladder 22 against the wall of the bottle 14.

The vent hole 33 (FIG. 2) permits upward expansion of the bladder 22 after the bladder 22 forms a seal with the interior of the bottle 14 and under circumstances such that air cannot be evacuated from the space above the bladder 22 through the exhaust tube 28 (FIG. 3). After the bladder 22 is inflated, the air inside the bladder 22 is prevented from escaping by closing the small gate valve 34 located on the inflation tube 20 between the cap 18 and the inflation bulb or pump 24. Preferably the exhaust tube 28 is withdrawn so that, although still retained by the cap 18, its inlet portion 30 is entirely above the top of the bladder 22 (FIG. 5). This facilitates formation of a seal of maximum tightness between the bladder 22 and the wall of the bottle 14. After withdrawal, a final squeeze of the bulb 24 expands the bladder 22 a little more tightly against the wall of the bottle, effecting a very reliable seal.

Protected in this way from the oxygen of the air, the bottle 14 can be conveniently stored for several days without refrigeration (which does not impede oxidation, but merely protects against bacterial action), to await the drinking of the remaining wine 12. At this time the valve 34 is opened to allow the bladder 22 to deflate, the cap 18 is withdrawn from the neck 16 of the bottle 14, and the apparatus 10 is set aside. The wine is found to be in the same condition as before sealing.

The cap 18 does not need to serve any protective function; its purpose is to hold the other parts in position. Protection of the wine 12 from the oxygen of the air is provided by the inflated bladder 22, which acts as a seal. The apparatus 10 is quickly and conveniently cleaned by holding the bladder 22 and air exhaust tube 28 under running water. The several parts are simple and resistant to wear. If any parts wear out they can be replaced in minutes, as there are no permanent seals. Since the apparatus 10 is not subjected to stress of appreciable magnitude during operation, the parts are designed simply to slide together and pull apart, like a ball-point pen and its cap.

Thus there is provided in accordance with the invention a device that is inexpensive, durable, compact, simple in design, and easy to use and to maintain. Many modifications of the preferred embodiment of the invention disclosed above will readily occur to those skilled in the art. For example, while the invention is described particularly as applicable to the preservation of wine, it can be used also to preserve other liquids that are stored in a container formed with an opening through which the liquid can be poured, the liquid only partly filling the container and being subject to oxidation. Moreover, the nature of the pump 24, the material of the bladder 22, and the length of the exhaust tube 28 can be varied within wide limits. Accordingly, the invention is limited only by the appended claims.

I claim as my invention:

1. Apparatus for retarding oxidation of a wine or other liquid that only partly fills a container formed with an opening through which said liquid can be poured, said apparatus comprising:

non-sealing cap means mountable adjacent to said opening;
   inflation tube mean insertable through said non-sealing cap means;
   air bladder means connected to said inflation tube means and postionable within said container;
   pump means connected to said inflation tube means and positionable outside said container;
   valve means connected to said pump means and said inflation tube means; and
   exhaust tube means insertable through said non-sealing cap means and having an inlet portion positionable within said container and an outlet portion positionable outside said container;
   whereby, when said non-sealing cap means is mounted adjacent to said opening, said bladder means and said inlet portion of said exhaust tube means are positioned within said container, said pump means and said outlet portion of said exhaust tube means are outside said container, and said pump means is activated, said bladder means expands within and forms a seal with said container and expels air from said container through said non-sealing cap means both through and exterior to said exhaust tube means, so that oxygen is substantially prevented from coming into contact with said liquid.

2. Apparatus according to claim 1 wherein said bladder means comprises an elastomeric balloon.

3. Apparatus according to claim 1 wherein said inlet portion of said exhaust tube means is flexible and displaced laterally by said bladder means as said bladder means expands.

4. Apparatus according to claim 1 wherein said pump means comprises a squeeze bulb.

5. Apparatus according to claim 4 wherein said valve means comprises a check valve connected to said squeeze bulb, whereby said bladder means can be inflated by manually squeezing said squeeze bulb.

6. Apparatus according to claim 5 further comprising a stopcock separate from said check valve connected to said inflation tube means for maintaining said bladder means in an inflated condition after said bladder means is inflated.

7. A method of retarding oxidation of a wine or other liquid that only partly fills a container formed with an opening through which said liquid can be poured, said method comprising the steps of:

mounting a non-sealing cap adjacent to said opening;
   positioning an air bladder within said container;
   inserting an exhaust tube through said non-sealing cap into said container beside said bladder;
   inflating said bladder so that it expands within and forms a seal with said container, said exhaust tube extending below said seal and exhausting air from a position within said container below said seal to facilitate downward expansion of said bladder, and said non-sealing cap being above said seal and exhausting air from a position within said container above said seal to facilitate upward expansion of said bladder; and
   then withdrawing said exhaust tube to a position above said seal in order to provide closer contact of said bladder with said container and improve said seal.

* * * * *